D. W. HUGHES.
Hand-Planter.
No. 167,251.
Patented Aug. 31, 1875.
Fig 1
Fig 2
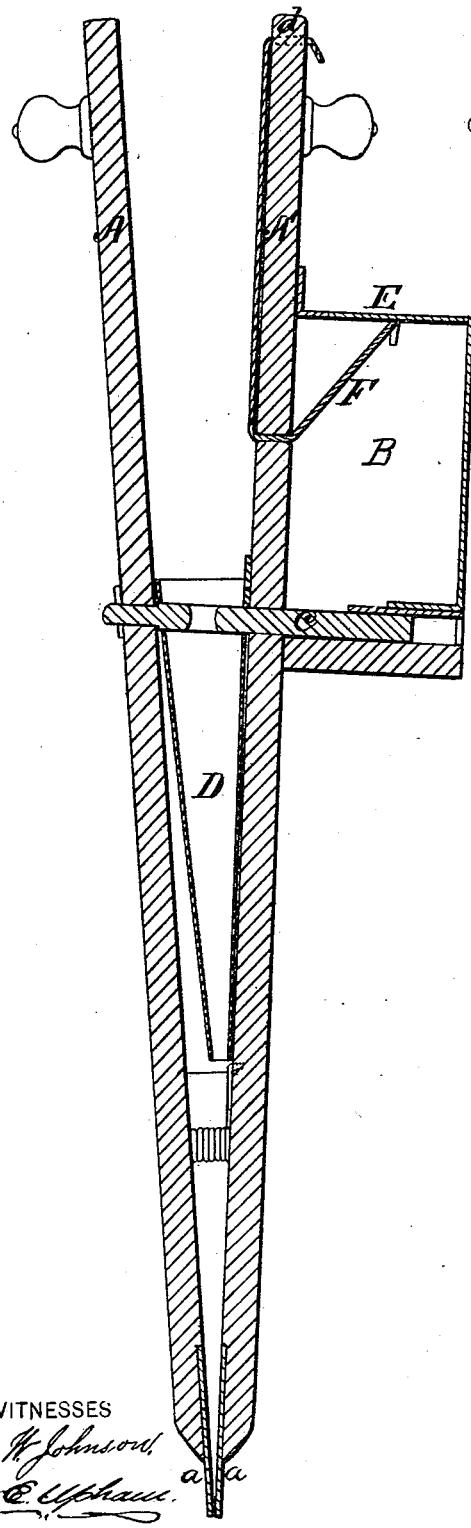
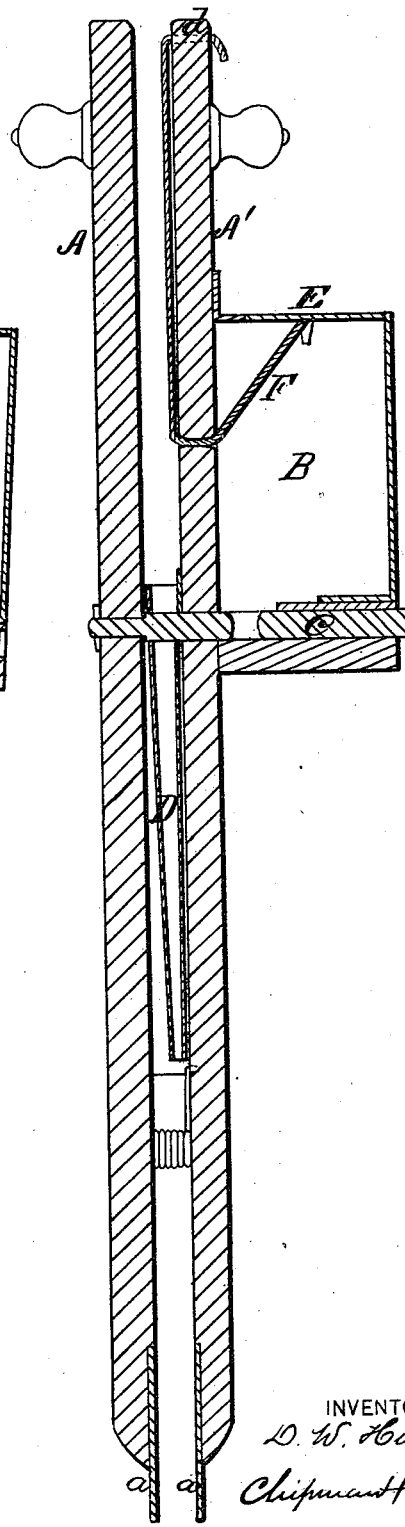
WITNESSES
Eug. W. Johnson
Geo. E. Upshaw
INVENTOR
D. W. Hughes
Chipman & Co
ATTORNEYS

UNITED STATES PATENT OFFICE.

DAVID W. HUGHES, OF ST. LOUIS, MISSOURI.

IMPROVEMENT IN HAND-PLANTERS.

Specification forming part of Letters Patent No. 167,251, dated August 31, 1875; application filed January 30, 1875.

*To all whom it may concern:*

Be it known that I, DAVID W. HUGHES, of St. Louis, in the county of St. Louis and State of Missouri, have invented a new and valuable Improvement in Hand-Planters; and I do hereby declare that the following is a full, clear, and exact description of the construction and operation of the same, reference being had to the annexed drawings making a part of this specification, and to the letters and figures of reference marked thereon.

Figures 1 and 2 of the drawings are representations of vertical sections of my hand-planter.

This invention has relation to hand corn-planters, wherein are employed two flat blades, hinged together near their lower ends, and operating a dropper, which communicates with a seed-box, to discharge a planting of seed into a cloth conduit rigidly secured to the lateral edges of the said blades below the dropper, whence it is deposited into the ground.

The nature of the invention consists in combining with the said blades and with the dropper a flexible tube, secured in position between the said blades, the same being within the lateral edges of the blades when they are brought together for the purpose of obtaining a fresh planting, whereby the said tube is protected from wear, and a means is provided whereby the operator is enabled to oversee the depositing of the seed into the soil.

In the annexed drawings, A A' designate the two blades of a corn-planter, hinged together near their lower ends, which ends are provided with metallic heels *a*. B designates a seed-box, rigidly secured to blade A' in any suitable manner; C, a dropper-slide, rigidly attached to blade A, and passing into the interior of the seed-box through an aperture cut in its side, and through the blade A', as shown in Fig. 2.

The parts above described being old, I do not claim any of them; but, in connection with these devices, it has been usual to secure to the lateral edges of the blades a flexible cloth, for the purpose of directing the seed accurately to the discharge or lower end of the said blades. This device has been found liable, in practical use, to this objection: that its edges, being exposed to the constant friction, not only of the person using it, but also of surrounding objects against which it may come in contact, is rapidly worn out, thereby detaching it from the blades, and rendering the same inoperative.

I propose to remedy this defect by using a flexible and, preferably, conical tube, D, rigidly secured, as to its upper end, just above the dropper *c*, which tube is also secured at its lower end, and is of such dimensions that when blades A A' are approximated, for the purpose of thrusting the dropper into the seed-box, its edges shall not protrude outward beyond the lateral edges of the said blades, and, consequently, will be entirely protected from being unduly worn out.

The tube D, above described, being conical in shape, is fastened to blades A A' with its flaring end upward and its smaller end downward, so that the seed can be admitted to the center of the blades and scattered equally in the hill, and the operator enabled to look down between the said blades and inspect the depositing of the seed into the ground.

E represents a detachable lid or cover, adapted to be fitted upon the open upper end of seed-box B, and to be secured thereon by meads of a cord, F, secured to its under side, passing thence downward into the seed-box through a perforation in its side and in blade A', and extending thence upward to an engagement with a vertical slit, *d*, cut in the upper end of the said blade, as shown in Fig. 2. By disengaging cord F from slit *d*, the lid may be detached from the seed-box when desired.

What I claim as new, and desire to secure by Letters Patent, is—

In a corn-planter, the combination, with the hinged blades A A' and the sliding dropper *c*, of the flexible conical seed-conduit D, substantially as specified.

In testimony that I claim the above I have hereunto subscribed my name in the presence of two witnesses.

DAVID W. HUGHES.

Witnesses:
GEO. O. ATHERTON,
JOHN T. DOWDALL.